Patented Feb. 21, 1950

2,497,882

UNITED STATES PATENT OFFICE 2,497,882

REFINED ROSIN PRODUCTS AND PROCESSES

Burt L. Hampton, Jacksonville, Fla., assignor, by mesne assignments, to The Glidden Company, Cleveland, Ohio, a corporation of Ohio No Drawing. Application February 23, 1946, Serial No. 649,775

9 Claims. (Cl. 260—105)

The present invention relates to the improvement of rosin and polymerized rosin, and particularly relates to such products which have diminished yellowing properties when made into soaps.

Soaps made from rosin yellow rapidly. This is true even in the case of the highest grade rosins, and is worse in this respect in the case of wood rosin than in the case of gum rosin. Apparently ordinary oxidation is not the principal cause of this yellowing. Instead, it appears that the yellow color is developed by reaction of alkali with certain unknown constituents of rosin. For instance, a hard cake of rosin-containing soap which is fairly white, when made, will yellow uniformly throughout the soap on aging. Similar discoloration occurs in the case of alkaline rosin sizes.

It is accordingly an object of the present invention to provide rosins and polymerized rosins which show improved resistance to yellowing when made into soaps and to provide soaps made from such rosins or polymerized rosins.

An additional object is to provide a process for preparing rosins and polymerized rosins which show improved resistance to yellowing when made into soaps.

Another object is to provide an improved rosin material for sizes.

Other objects will be apparent to those skilled in the art from the following description.

It has been found that the objects of the present invention are accomplished if rosin or polymerized rosin is treated with sulfur in the presence of sufficient alkali to partially neutralize the rosin acids and form an alkali metal soap. Apparently the alkali used to neutralize the rosin reacts with yellowing constituents of rosin to yield products which are destroyed by the treatment with sufur. When soap curds are made from ordinary rosin, the mother liquor has a strong yelow color and the soap itself is yellow. When pure sodium rosinate is made from the rosin prepared according to the present invention, the mother liquor is nearly as clear and colorless as water, and the soap curds are fairly white and show little tendency to yellow on aging.

Ordinary gum rosin and ordinary polymerized rosin treated according to the present invention are apt to exhibit an accentuated fluorescence. This fluorescence is believed to be due to metals which are ordinarily dissolved in the rosin during the collection of the gum in which metal gutters and cups are used. If this tendency to exhibit fluorescence is to be overcome, these metals should be removed. It is therefore preferred to subject the rosin to an acid wash to remove these metals, so that the metal content is reduced to less than about .001% or .002%. Such rosin is substantially metal-free. However, it should be kept in mind that even though the rosin is not metal-free and hence shows fluorescence, it still will make a good soap, although the curds from such a rosin have the appearance of being slightly dirty.

The amount of alkali which is used is preferably not in excess of that which will produce crystallization of the alkali resinate. In the case of sodium hydroxide, this amount is about 5% by weight of rosin. This corresponds to about 38% of resin saponified. That is, not more than about 38% of the stoichiometric quantity of alkali needed to neutralize the rosin is employed. This quantity will produce about 40% of soap by weight of the original resin. Thus, the amount of soap formed should not exceed about 40% by weight of the original rosin. Preferably, at least about 10% of the stoichiometric quantity of alkali needed to neutralize the rosin should be present, but lesser quantities in excess of the minimum effective amount may be used. Any suitable alkali metal alkali may be used, such as the hydroxides, oxides, and carbonates of sodium, potassium, etc. Also, the alkali metal dissolved in alcohol may be used.

The amount of sulfur may vary as indicated in the following table, the percentages being based on the weight of the rosin to be treated.

| | Per cent |
|---|---|
| Sulfur effective limits | .5 to 5 |
| Sulfur practical limits | .5 to 3 |
| Sulfur preferred limits | 1.0 to 3 |

The practical limits indicated above are those which would normally be encountered in plant operations.

Mixtures of selenium and sulfur may also be used. Preferably, the sum of the amounts of each element in the mixture should not exceed about 5% by weight of the rosin. A mixture which has been found particularly useful is made up to contain selenium about .15% on the rosin and sulfur about 2% on the rosin. This mixture may be used as a blend, or the selenium may be introduced first, reacted, and the sulfur then added.

In my co-pending application Serial No. 649,772, now U. S. Patent 2,494,550, filed on even date herewith is disclosed a process for treating rosin material with selenium to stabilize it and to increase its resistance to yellowing when made into soap and sizes.

Compounds of sulfur which yield sulfur under the conditions of the treatment may be used in place of the elemental material, or in admixture with the elemental material, on a stoichiometric basis. Such compounds are sulfur halides, and alkali sulfides or poly sulfides. $SO_2$ is not useful.

The temperature of the heat treatment may vary considerably, but in general the temperature should be between 200° C. and 375° C. The time of treatment may also vary. From the following examples it will be understood that the time, the temperature and the amount of sulfur may be varied over limited ranges because these three factors are somewhat dependent upon each other. Thus, the higher the temperature, the shorter the time; and the larger the amount of sulfur, the less severe the heat treatment should be in respect to temperature and time. The factors of time, temperature and concentration of the catalytic material should be chosen such that the degree of unsaturation of the abietyl compounds of the rosin or polymerized rosin will be decreased without aromatization of substantially more than one ring of the rosin compounds. A time period of one to three hours at a temperature of around 275° C. is generally satisfactory with sulfur concentrations of between about 1% and 3%. Since aromatic compounds are rather easily sulfonated, sulfonation by the method described hereinafter may be employed as a measure of the extent of aromatization. The specific optical rotation of the treated rosin or polymerized rosin may be compared with that of the untreated rosin material as a further test of aromatization. The gain in weight of samples exposed to the air, or a test of iodine, may serve as guides to the extent of change effected in the unsaturation of the rosin materials. Preferably, however, the effectiveness of the treatment is observed by its effect on the color developed in soap made from the treated rosin material.

It is also preferred to remove volatile products formed during the reaction. This may be done by sparging the molten reaction mass with steam, carbon dioxide, or nitrogen, or by subjecting the reaction mass to reduced pressure or vacuum distillation. It is advantageous also to provide a protective atmosphere around the reaction mass during most or all of the treatment. Where sulfur is the only catalytic agent employed in the treatment, steam provides a suitable atmosphere which may be used during all stages; that is, while heating the reaction mass to the treatment temperature, while holding it at the treatment temperature, and while cooling it therefrom. When both sulfur and selenium are used, carbon dioxide or nitrogen may be used while heating up and while reacting the mass. Steam may then be applied while cooling the mass, although carbon dioxide or nitrogen could be used to advantage during the cooling stage to remove water vapor. It should be recognized that a protective atmosphere is not essential to the process, since a good product is obtained in the absence of an inert gas if a large quantity of the material is treated in a closed vessel.

The following examples illustrate the effects of sulfur.

In all of these examples, the reaction mass was stirred during treatment, and a carbon dioxide atmosphere was maintained before and after the treatment.

EXAMPLE I
(A blank)

500 parts of metal-free WW gum was heated to 160° C. and 30 parts of a 50% NaOH solution by weight was added slowly. The reaction mass was heated to 275–285° C. for 3 hours and then steam distilled at 265–275° C. for 30 minutes. The product graded WW-X, and the optical rotation was alpha$_D$ +7°. Soap curds made from this resin were of much better color than those made with ordinary rosin, but they showed a strong tendency to yellow on standing.

EXAMPLE II
(A blank)

150 parts of WW gum rosin which had been acid-washed to remove its metal content was heated at 275–285° for 3 hours. Grade WW+; acid number 154; R & B M. P. 75°.

The soap curds made from this heat-treated rosin were not as yellow as those made from ordinary WW rosin, but they showed a strong tendency to yellow on long standing.

EXAMPLE III 500 parts of ordinary WW gum rosin was heated to 150° C. and 16 parts of 50% NaOH was slowly added. When the temperature reached 190° C., 15 parts of sulfur was added and the reaction mass was then heated at 275–285° for 3 hours. Grade WW. R & B M. P. 112° C.

Soap curds made from this rosin showed little tendency to yellow deeply although a pale yellow color developed.

EXAMPLE IV 500 parts of H–I resin made by adding 3% NaOH to a gum rosin was heated to 200° and 10 parts of sulfur added. It was then heated at 275–285° for one hour and finally steamed at 250–260° for 35 minutes. Grade N; acid number 117; R. & B M. P. 110°.

This resin did not make as white a soap as when a WW rosin was used, but the tendency to yellow deeply had been largely removed.

EXAMPLE V 500 parts of grade H–I resin made by adding 3% NaOH to a gum rosin was heated to 200° and 15 parts of sulfur added. The reaction mass was then heated at 270–280° for one hour and finally steamed at 250–260° for 30 minutes. Grade N–; acid number 112, R & B M. P. 111° C.

This resin did not make as white a soap as when a WW rosin was used, but the tendency to yellow deeply had been largely removed.

EXAMPLE VI 500 parts of grade N polymerized rosin of R & B M. P. 98°, acid number 149 was heated to 220° and 10 parts of NaOH in 10 parts of $H_2O$ was added. 10 parts of $H_2O$ was added. 10 parts of sulfur was then added and heating was continued at 275–285° for one hour. The resin was finally steamed at 265–275° for 30 minutes. Grade WG; R & B M. P. 112°; acid number 110; alpha$_D$ +19°. Soap made from this resin was pale yellow and showed little tendency to develop a deep yellow color on aging.

The tests indicated in the foregoing examples were made as follows:

(1) All melting points were determined by the ring and ball method, and are reported on the centigrade scale.

(2) Optical rotations were run in about 2% concentration in 95% ethanol and calculated to specific rotation (alpha).

(3) *Preparation of soap curds.*—Fifty milliliters of water was brought to a boil in a 400 ml. beaker and 13 grams of powdered rosin was added. When the rosin had melted, 3 ml. of 50° Bé. sodium hydroxide was added; the solution was stirred until it thickened; then 20 ml. of 50° Bé. sodium hydroxide was added, and the mass was stirred vigorously until curdy. The curds were then separated from the water.

(4) If sulfonating tests are to be made for dehydroabietic acid, they are conveniently made by sulfonating 50 g. samples with 200 ml. concentrated sulfuric acid at 10°–15° C., pouring the reaction mixture into about one liter of water, separating crude sulfonation product from the dilute sulfuric acid and extracting the water-soluble sulfo dehydroabietic acid with boiling water.

It should be understood that soaps and sizes made from my improved rosin materials may include other ingredients customarily included in such products. Thus the soaps may include either major or minor amounts of a saponified material selected from the class consisting of fats, fatty acids, saponifiable oils, and the partially, saponified oils, and the partial saponification products thereof. Sizes may include such saponified materials also, with or without a variety of other ingredients customarily used in sizes to effect particular results, functions, properties, or characteristics.

In the following claims, the term "rosin material" is used generically to refer to gum, wood, or polymerized rosin, all or any of which may contain metals, may be naturally substantially free of metals, or may have been acid-washed to remove the metals.

Having described the invention, what is claimed is:

1. The process of producing an improved rosin composition characterized by imparting an increased resistance to yellowing in soaps and sizes made therefrom, which process consists of heating a rosin material under non-oxidizing conditions with from 0.5% to 5% in sulfur equivalent of at least one catalytic material selected from the group consisting of sulfur, sulfur halides, alkali metal sulfides and alkali metal polysulfides, in the presence of a small percentage up to about 38% of the stoichiometric quantity of an alkali metal alkali required to neutralize the rosin material, at a temperature between about 200° C. and 375° C. for a time sufficient to decrease the degree of unsaturation without aromatization of substantially more than one ring of the rosin material.

2. The process of claim 1 in which the catalytic material is sulfur in amounts of from 0.5% to 3%.

3. The process of producing an improved rosin composition characterized by imparting an increased resistance to yellowing in soaps and sizes made therefrom, which process consists of heating a rosin material under non-oxidizing conditions with from 1% to 3% of sulfur in the presence of a small percentage up to about 38% of the stoichiometric quantity of an alkali metal alkali required to neutralize the rosin material at a temperature of 200° C. to 375° C. for a time sufficient to decrease the degree of unsaturation without aromatization of substantially more than one ring of the rosin material.

4. The process of producing an improved rosin composition characterized by imparting an increased resistance to yellowing in soaps and sizes made therefrom, which process consists of heating a rosin material under non-oxidizing conditions with from 0.5% to 5% in sulfur equivalent of at least one catalytic material selected from the group consisting of sulfur, sulfur halides, alkali metal sulfides and alkali metal polysulfides, in the presence of a small percentage up to about 38% of the stoichiometric quantity of an alkali metal alkali required to neutralize the rosin material, at a temperature between about 200° C. and 375° C. for a time sufficient to decrease the degree of unsaturation without aromatization of substantially more than one ring of the rosin material; and thereafter removing volatile reaction products from the treated rosin material while in the liquid phase.

5. The process of producing an improved rosin soap characterized by having an increased resistance to yellowing when aged, which process consists of heating a rosin material under non-oxidizing conditions with from 0.5% to 5% in sulfur equivalent of at least one catalytic material selected from the group consisting of sulfur, sulfur halides, alkali metal sulfides and alkali metal polysulfides, in the presence of a small percentage up to about 38% of the stoichiometric quantity of an alkali metal alkali required to neutralize the rosin material, at a temperature between about 200° C. and 375° C. for a time sufficient to decrease the degree of unsaturation without aromatization of substantially more than one ring of the rosin material; thereafter removing volatile reaction products from the treated material while in the liquid phase; and converting said treated material to soap.

6. The process of claim 4 wherein the catalytic material is sulfur in amounts of from 0.5% to 3%.

7. The process of claim 5 wherein the catalytic material is sulfur in amounts of from 0.5% to 3%.

8. An improved rosin composition characterized by imparting a diminished tendency to yellow on aging to soaps and sizes made therefrom, said composition being the product of the process as claimed in claim 1.

9. An improved rosin soap characterized by diminished tendency to yellow on aging, said soap being the product of the process as claimed in claim 5.

BURT L. HAMPTON.

REFERENCES CITED

The following references are of record in the file of this patent:

UNITED STATES PATENTS

| Number | Name | Date |
|---|---|---|
| 2,085,151 | Georgi | June 29, 1937 |
| 2,277,351 | Pohle et al. | Mar. 24, 1942 |
| 2,351,949 | Georgi | June 20, 1944 |
| 2,359,404 | Colgate et al. | Oct. 3, 1944 |

OTHER REFERENCES

Lombard, Comptes Rendus, 213, pages 793–796, December 1941.